Dec. 10, 1929. C. B. BARTLEY ET AL 1,739,055
SYSTEM OF SUPERVISORY SIGNALING AND REMOTE CONTROL
Filed Sept. 14, 1925 4 Sheets-Sheet 1

INVENTORS
Charles B. Bartley
Virgil N. Dake
by C. M. Clarke Atty

Dec. 10, 1929.    C. B. BARTLEY ET AL    1,739,055
SYSTEM OF SUPERVISORY SIGNALING AND REMOTE CONTROL
Filed Sept. 14, 1925    4 Sheets-Sheet 2

INVENTORS
Charles B. Bartley
Virgil H. Dake
by V. C. M. Clarke Atty.

Dec. 10, 1929.   C. B. BARTLEY ET AL   1,739,055
SYSTEM OF SUPERVISORY SIGNALING AND REMOTE CONTROL
Filed Sept. 14, 1925   4 Sheets-Sheet 4
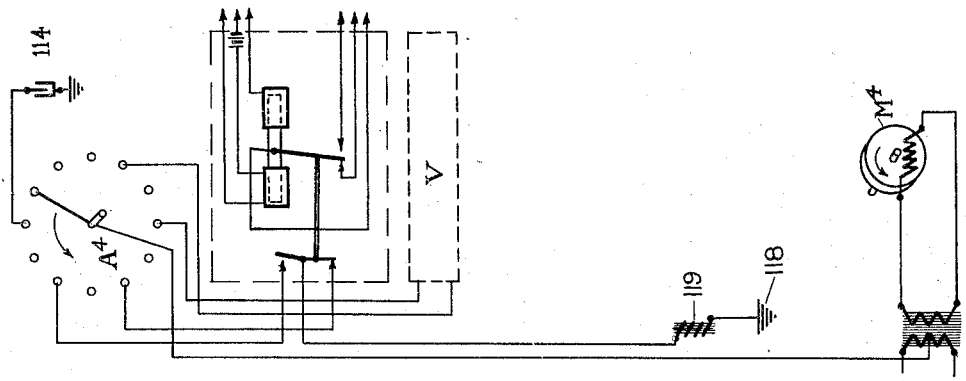
FIG 4
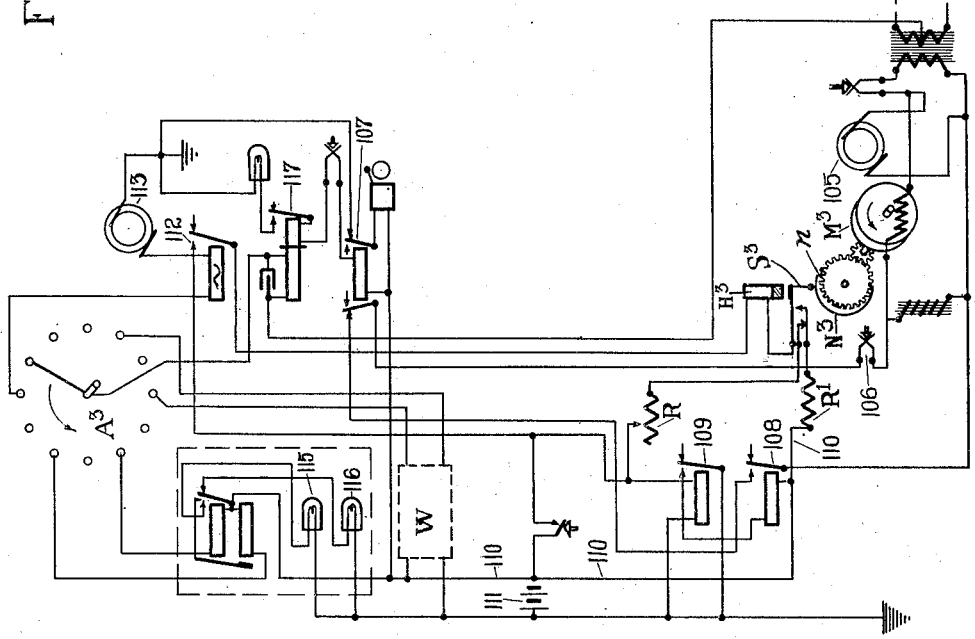
INVENTORS
Charles B. Bartley
Virgil N. Dale
by C. M. Clark
Atty Patented Dec. 10, 1929

1,739,055

UNITED STATES PATENT OFFICE

CHARLES B. BARTLEY AND VIRGIL H. DAKE, OF PITTSBURGH, PENNSYLVANIA

SYSTEM OF SUPERVISORY SIGNALING AND REMOTE CONTROL

Application filed September 14, 1925. Serial No. 56,184.

This invention relates to circuits and apparatus for the control of supervisory indicating and teledynamic control equipment, and other similar equipment employing synchronous motors, of which the Warren clock motor is a type, as motive power for the operation of selector devices. By selector devices, we mean equipment designed to establish or complete electrical circuits, including more or less widely separated but correlated equipment and circuits, in such a manner as to afford a saving in the number of electrical channels otherwise necessary between such separated but correlated equipment and circuits.

The invention may be described in connection with electric power distribution, to which it is particularly applicable, but it will be understood that it may be adapted, either with or without modification to a large number of uses and applications where it is necessary or desirable to know at a central point the position or condition of a remotely located movable or operating part, or to effect a movement or control of such movable or operating part.

In a system for the distribution of power over a considerable territory, it is necessary that there be, in addition to the main or central station, one or more sub-stations. It is desirable and necessary that the main station have a certain amount of supervision over the sub-station. The main station should be able to ascertain at any time the position of any major switch in the sub-station, whether it be open or closed, whether any motors or generators at the sub-station are functioning properly, or be otherwise advised of the position, condition or status of apparatus at the sub-station.

It is further highly desirable that it be possible to operate or control switches or other apparatus in the sub-station from the central or main station.

From the foregoing, it is to be understood that the invention may include only supervisory signal circuits, or supervisory signaling together with teledynamic control, or the orderly successive establishment of other circuits for other purposes.

It is an object of the invention to provide means for the automatic establishment and maintenance of a condition of coincidence between correlated parts of selectors and synchronous motors; that is, synchronization of parts with regard to position where such parts are synchronized as to velocity of movement through use of synchronous motors.

It is a further object of the invention to provide means such that when correlated parts of such synchronous motor driven selectors are de-synchronized with regard to position that indicating and control circuits will cease to function until positional synchronism is re-established.

A further object of the invention is to provide automatic positional synchronizing means which periodically functions, preferably once for each cycle of operation.

It is a further object of the invention to provide means whereby the aforementioned positional synchronism of parts may be obtained without increase in the number of electrical channels otherwise required between separated but related selectors.

It is a further object of the invention to provide means for the accomplishment of the above-described operations such that the installation and maintenance of sources of energy for the performance of all functions of an indicating and control system may be restricted to a convenient central location.

These and other objects and advantages are obtained by our invention which may be understood by reference to the accompanying drawings, in which:

Figure 4 is a detail view of a simple circuit having but one connecting channel other than the ground between the two stations.

Figure 1:
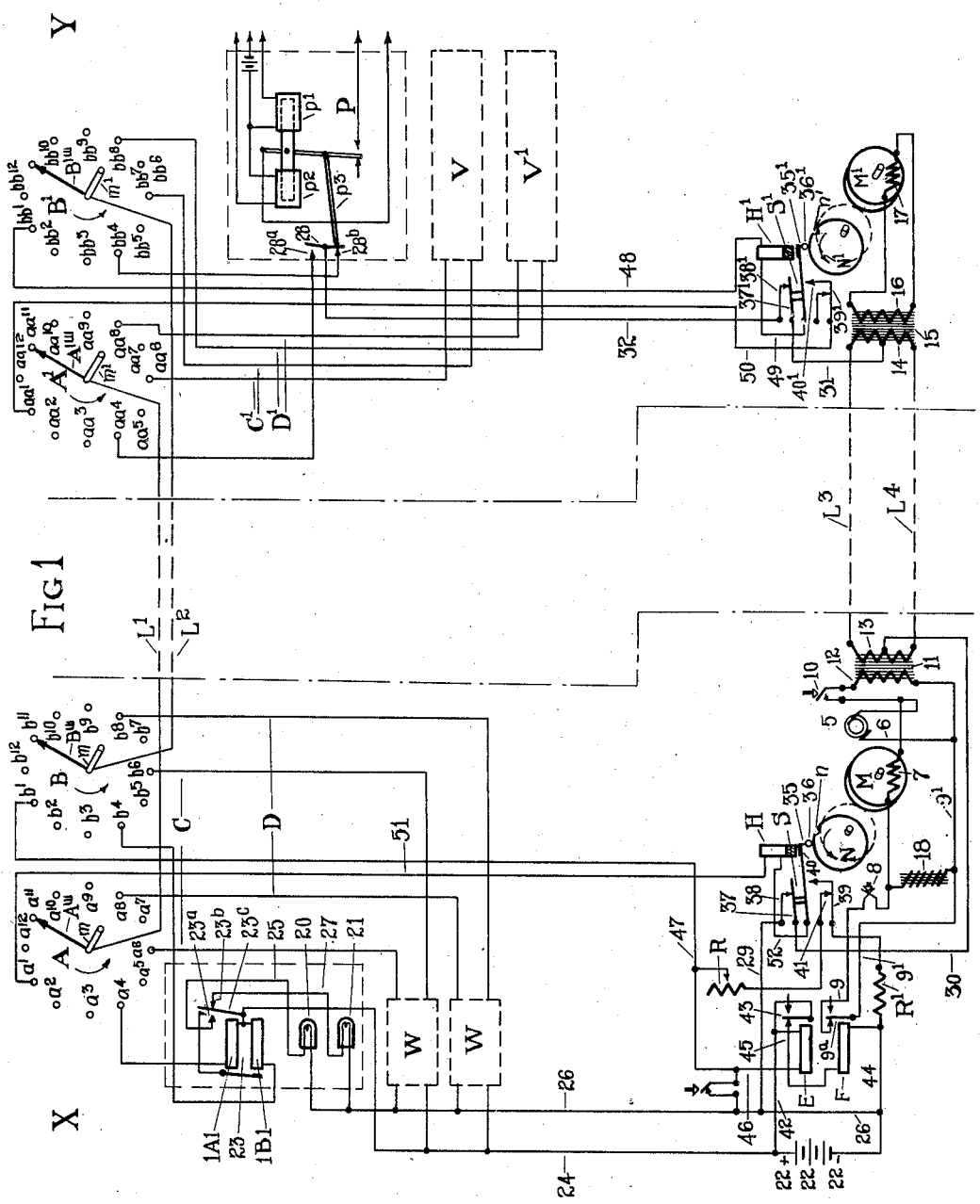
Figure 1 is a simple circuit diagram of a system embodying our invention but for supervisory signaling only, and for simplicity the circuits for only one unit at the sub-station are illustrated.

Referring first to Fig. 1, X designates the main or central station and Y designates a sub-station or controlled station.

At the sending station is a selector unit and at the sub-station is a correspondingly arranged selector unit. The unit at the control or main station includes an actuating device M, a cam element N, and one or more, preferably two, selectors A and B, respectively. Selector A includes a plurality of fixed contacts $a^1$, $a^2$, $a^3$, $a^4$, etc., the last contact, for the purpose of illustration being $a^{12}$, while selector B includes similarly arranged contacts $b^1$, $b^2$, $b^3$, $b^4$, etc., to $b^{12}$. For successively engaging the contacts of each selector, there is a wiper $Aw$ and $Bw$, respectively, these wipers being moved by the actuating device M.

Figure 2:
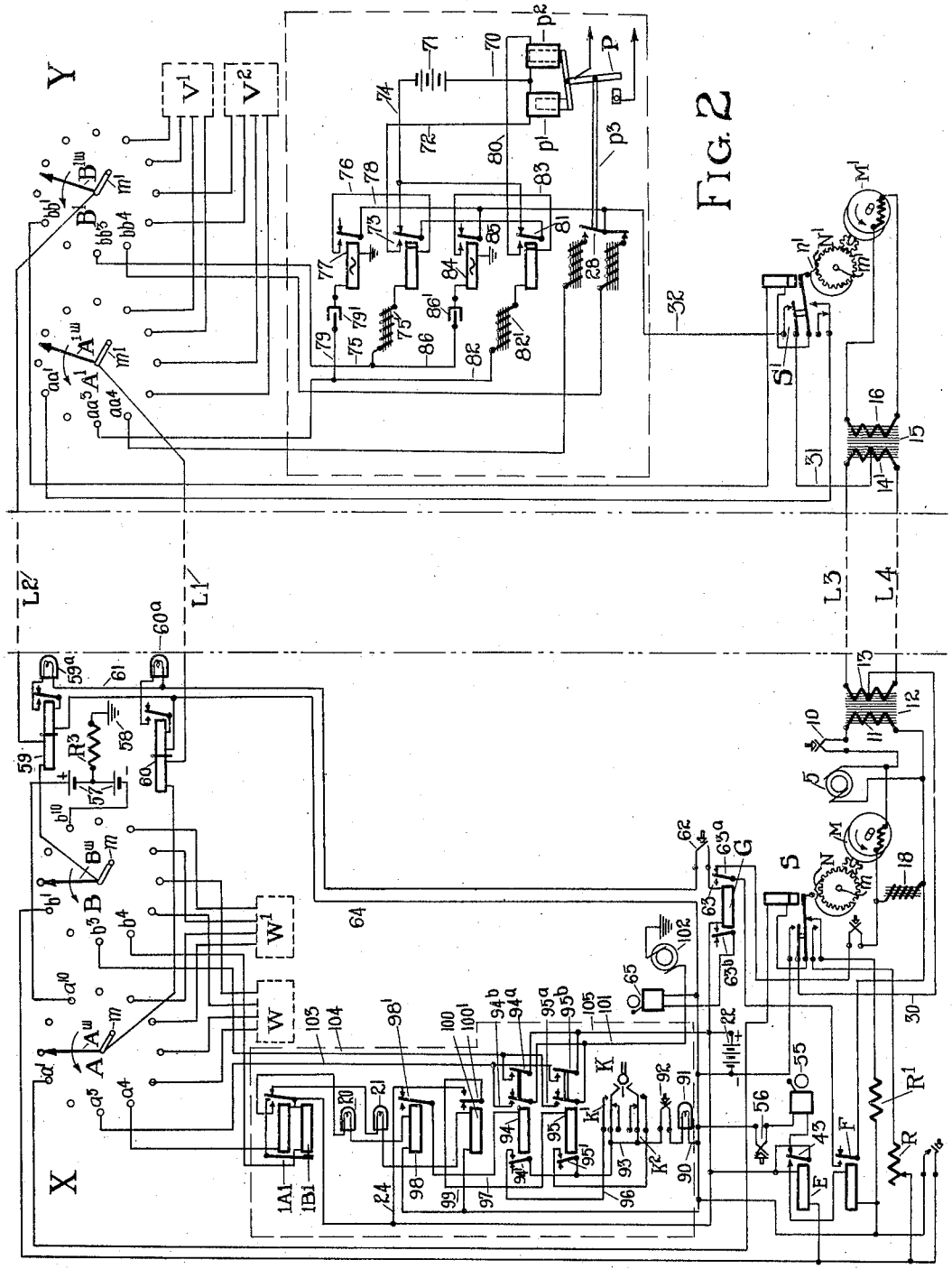
Figure 2 is a view generally similar to Fig. 1, but showing the selector devices out of synchronism, and, in addition thereto, means for effecting a remote or teledynamic control of one of a group of units in the sub-station.
Figure 3:
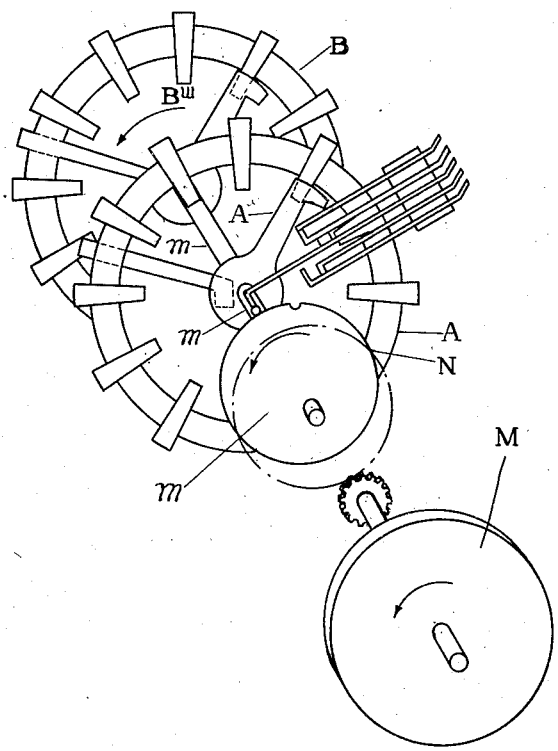
Figure 3 is a more or less diagrammatic view of one form of selector and re-synchronizing mechanism.

For the purpose of illustration, we have shown, and as a matter of preference, use, a motor of the Warren type as the actuator M. This actuator, whatever its structure, must be of a type whose speed is directly responsive to the frequency of an alternating or pulsating current. Any synchronous motor of a well known or preferred type may be well adapted for this purpose. In the drawings the speed of the selector devices is controlled by means of suitable change speed gearing as indicated, to any desired extent. The motor or actuator drives a shaft $m$ to rotate the cam N and the wipers $Aw$ and $Bw$. In Figs. 1 and 2 I have illustrated the several elements in a diagrammatic or "exploded" fashion, but Fig. 3 illustrates the mechanical connection between the several parts.

At the controlled location or sub-station the selector unit includes the actuator M' its shaft $m'$, cam N' and selectors A' and B' having actuated wipers A'$w$ and B'$w$, respectively, and contacts $aa^1$, $aa^2$, $aa^3$, $aa^4$, etc., to $aa^{12}$ and $bb^1$, $bb^2$, $bb^3$, $bb^4$, etc., to $bb^{12}$, respectively. The selectors A' and B' correspond in all respects to selectors A and B.

The motor or actuator M' corresponds to motor or actuator M, and operates at exactly the same speed as motor M on the same input frequency. Inasmuch as motors M and M' are of the same type, they may normally operate in synchronism if they are operated from a common supply of alternating or pulsating current. Their synchronous operation effects a synchronous movement of the cams N and the wipers of the several selectors, so that corresponding contacts of the control and controlled station selectors can be simultaneously connected in circuit.

For operating the motors or actuators M and M', a source of alternating or pulsating current 5 may be provided at the main station X, this supply having lead wires 6 that connect with opposite sides of the motor circuits.

The circuit for motor M normally includes the motor winding 7, a manual switch 8, a relay actuated switch 9 back to the source of supply through line 9'.

The circuit for motor M' preferably includes the source of supply 5, the manually operable switch 10 at the main station, the primary 11 of a transformer 12, back to line. Two lines, $L^3$ and $L^4$ lead from the secondary 13 of the transformer 12 to the primary 14 of the controlled or distant station transformer 15. The secondary 16 of this transformer goes to the windings 17 of motor M'.

The line transformers are such that the frequency supplied the motor M' is the same as the input frequency at 5. The motors, being designed to operate at identical speeds at the same frequency, therefore normally operate in synchronism. The magnetic switch 9 may be shunted by a reactance 18 by means of which the motor M may be maintained partially energized when the switch 9 is open, to keep the motor M under a starting tension until such time as the switch 9 closes, thus ensuring immediate response of the motor to the closing of the switch, under the operation hereinafter described.

It may happen that the motors M and M' may be thrown out of positional synchronism or relatively coincident operation. That is, while ordinarily responding to the same extent to the same common frequency, due to some interruption or line trouble, one selector may get in advance of the other. In order to automatically maintain the same relation between the main and sub-station selectors, we provide for the automatic resetting and synchronization of the motors at regular intervals, preferably once during each rotation of the wipers.

Before such automatic resetting mechanism is described in detail, the connection between selectors may be generally outlined.

The wiper of selector A is directly connected with the wiper of selector A' by the channel or wire L'. Selectors B and B' are electrically separate from the respective selectors A and A', and the wipers of selectors B and B' are connected by channel or line $L^2$.

The four lines, $L^1$, $L^2$, $L^3$, and $L^4$ are the maximum number of "through" connectors between the two stations. It is proposed that the number of contacts in each selector correspond to the number of supervisory signals ordinarily required in commercial practice. If for instance, there are six switches at the sub-station whose positions are to be indicated at the main station, there are six active contacts in each selector, each switch requiring a contact on one selector for signaling "open" position and a contact on the other selector for signaling "closed" position to the main station. In addition to this, there may be contacts for teledynamic operation of the switches, as hereinafter explained, and there is a contact on each selector for the motor synchronizing circuits above mentioned and hereinafter described.

In Figure 1 we have shown just so much of the circuits as is preferably required for indicating at the main station whether one switch at the sub-station is open or closed, and as is required for the resynchronizing or resetting feature. Signals for other switches would involve mere duplication of the apparatus shown.

The indicating signals may comprise suitable lamps or other devices. We have shown a red lamp 20 at the main station to indicate a closed switch at the distant station and a green lamp 21 to indicate an open switch. At 22 is a local battery having a positive side 22+ and a negative side 22−. At 23 is a double acting relay having contacts 23$^a$ and 23$^b$, and having an armature 23$^c$. This relay has coils 1A$^1$ and 1B$^1$, and is of the type in which the armature may be retained in either position. In operation, armature 23$^c$ is drawn towards the core of solenoid 1A$^1$ when that coil is energized. The armature is locked in this position, due to the latch attached to the left-hand armature. The latch being relatively heavy, normally holds the left hand armature away from the core of coil 1B$^1$. When the latter coil is energized, following de-energization of 1A$^1$, the left hand armature is drawn to 1B$^1$, the latch is raised, and, as a consequence, armature 23$^c$ falls away from its front contact 23$^a$ and again rests on the back contact 23$^b$.

The circuit for lamp 21 includes the positive side of the battery 22+, wire 24, armature 23$^c$, contact 23$^b$, wire 27, lamp 21, and wire 26 to the negative side of the battery. This circuit is shown closed by reason of the position of armature 23$^c$. The circuit for lamp 20 is wire 24, armature 23$^c$, contact 23$^a$, wire 25, lamp 20 and wire 26 to the battery. This circuit is shown open, indicating an "off" or "open" position of a switch at the remote station.

At the remote station, the switch itself is designated P and may be manually or electrically operated. We have shown it, in Fig. 1 as being of an electrically operated type, being closed by solenoid $p'$ and opened by solenoid $p^2$. We mention a switch specifically, but the invention applies equally to other apparatus. A rod $p^3$ connects the switch P with a supervisory signal switch 28 of single pole double throw type having contacts 28$^a$ and 28$^b$. Contact 28$^a$ goes to one of the contacts of selector A$^1$, say for instance $aa^4$. Then contact 28$^b$ connects with the corresponding contact $bb^4$ of selector B$'$.

At the main station one of the contacts of selector A, say $a^4$ connects with coil 1A$^1$ of relay 23. The other end of this coil connects with the pole 22+ of battery 22 through wire 24. Contact $a^4$ of selector A corresponds with contacts $aa^4$ of selector A$'$. Similarly, contact $b^4$ of selector B, corresponding to contact $bb^4$ of selector B$'$, is connected with coil 1B$^1$ of relay 23. The other side of this coil connects to wire 24.

The circuit for either of the relay coils 1A$^1$ or 1B$^1$ from the negative of the battery 22 at the central station to switch 28 at the distant station is through wire 26, wire 29, central station synchronizing switch S, wire 30, simplexed circuit L$^3$—L$^4$ wire 31, distant station synchronizing switch S$'$, and wire 32. The simplexed circuit L$^3$—L$^4$ will be understood by those skilled in the art, being one half of the so called "phantom circuit" and being formed by tapping the middle points of the line side windings 13 and 14 of the terminal transformers 12 and 15 respectively of the alternating motor circuit so that the lines L$^3$ and L$^4$ act, so far as the battery current is concerned, as a single wire between the two stations. In other words, it functions as a ground connection between the two stations without introducing into the system earth currents or ground potentials.

If we assume the selectors of the two stations to be operating in unison, and in co-relation, the green light 21 will burn as long as the parts are in the position shown. If however, switch P is closed, rod $p^3$ moves switch 28 opening the B—B$'$ selector circuit along line L$^2$ and closing the A—A$'$ selector circuit to $aa^4$. When the wipers A$w$ and A$'w$, moving concomitantly reach contacts $a^4$ and $aa^4$, respectively, a circuit will be closed through relay coil 1A$^1$ and the simplexed circuit. Energization of relay 1A$^1$ actuates armature 23$^c$ to open the green light circuit and close the red light (20) circuit. The red light will then remain lighted until switch P is again operated to open position to restore the circuit to the condition shown in Fig. 1. When this happens, relay coil 1B$^1$ will be energized to light lamp 21 and extinguish lamp 20 when the wipers of selectors B and B$'$ contact with contacts $b^4$ and $bb^4$, respectively.

Each of the several contacts of the several selectors may similarly be connected with other switches or other apparatus, so that the wipers of the selectors will successively include all apparatus in the sub-station and all corresponding signals or control circuits in the main station. For instance, wires C of the main stations may connect with another relay circuit with a lamp diagrammatically indicated as W, and similar to the circuit described, while wires C$'$ at the substation might go to another switch similarly arranged to switch 28, diagrammatically designated V. Also wires D and D$'$ at the main and sub-stations, respectively may correspondingly be connected to establish closed circuits in suitable apparatus such as indicated at W' and V' respectively, as described, etc.

The only limitation in the number of contacts on the wipers, or the number of devices to be supervised or operated over the lines L¹, L², L³, and L⁴ is confined to mechanical expediency, and to the maximum time interval which would be desirable between successive closing of the same circuits. Thirty or more contacts may easily be included in each selector and the wiper might easily contact successively with each selector contact every minute, every thirty seconds, or more frequently.

From the foregoing, it will be clear why the motors M and M' must not only run in synchronism, but why they must always maintain the wipers in the same relative positions. The resetting feature for maintaining this relation may now be described.

At the main station is a switch S and at the distant station there is preferably a switch S'.

Switch S includes a switch lever 35 having a roller 36 adapted to bear on the periphery of the cam N. The cam N has a notch $n$ therein into which the roller may enter upon every revolution of the cam. Suitably positioned with respect to the lever is a magnet H for retracting the switch lever 35 when roller 36 enters the notch. Movable with the lever 35 but insulated from it is a switch arm or lever 37 which makes and breaks contact at 38 between wire 29 to the negative side of the battery and wire 30 to the simplexed circuit so that when contact is broken by the dropping of lever 35, the circuit between any of the contacts of the several selectors, such as the circuits controlling lights 20 and 21, can not be completed. The switch S also has a lever 39 with which lever 35 makes contact when it drops, such contact being made at point 40. When lever 35 drops, it also moves lever 39 down to break a contact at 41.

The switch S' is generally similar. It includes switch member 35' with cam engaging roller 36' adapted to move or drop into notch $n'$ in cam N'. Associated therewith is a second lever 37' which makes and breaks contact at 38' between wires 31 and 32 to open and close the battery circuit between the simplexed circuit and the selectors, so that no circuit can be completed through the simplexed circuit and the selectors if the arm 35' drops. When arm 35' drops it makes a contact at point 40'. This switch has an electromagnetic lifting device H' similar to coil H.

The purpose of this arrangement is to stop the motor M at the main station when one of the motors is advanced relatively to the other and to start the motor M when the two are in proper phase relation, and the circuits may now be described.

Included in the circuit for the motor M is the electro-magnetic switch 9 having a circuit closing armature $9^a$ and coil F. The armature $9^a$ remains in circuit closing position only as long as the coil F is energized. The circuit for coil F includes wire 42 from the battery, relay switch 43, coil F and return wire 44. The relay 43 closes the circuit of coil F only when its coil E is energized. The circuit for coil E is normally closed, and includes wire 42 from the battery 22, wire 45, coil E, wire 46, variable resistance R, contact 41 of switch S, resistance R', and wire 44 back to battery. Wire 46 is divided at resistance R, and branch 47 goes to one of the contacts of one of the selectors, as, for instance, contact $b^1$ of selector B. Leading from a corresponding contact of selector B', that is contact $bb^1$ is a wire 48 leading to holding device coil H'. From holding device, coil H' is a wire 49 connecting to switch lever 35', which may contact with lever 39' at point 40'.

From switch lever 39' is a wire 50 leading to contact $aa^1$ of selector A', this contact corresponding in position to contact $bb^1$.

Leading from contact $a^1$ of selector A. (this contact corresponding to contact $aa^1$ of selector A',) is a wire 51 going to coil H. From coil H, a connection 52 goes to switch arm 35 that is adapted to make contact at 40 with wire 44 to the negative side of the battery.

The operation may now be traced. It may first be stated that magnetic holding devices H and H' are of the delayed releasing type known in the art, so that they do not respond immediately to the deenergization of their coils. It may also be stated that notches $n$ and $n'$ are in the same relative position with respect to each other as the respective selector wipers, and these notches move beneath the respective rollers at the same time their respective wipers move onto the motor control contacts $a^1$ and $b^1$ and $aa^1$ and $bb^1$, respectively.

If the selectors of each unit are in corresponding positions as shown in Fig. 1, the motor control relays E and F will be energized and both motors will operate in unison. The holding devices H and H' are not in circuit with the battery, but the switch arms 35 and 35' of switches S and S¹, respectively are held in position to maintain the proper functioning of the several circuits by reason of their rollers engaging the peripheries of the cams. If both notches $n$ and $n'$ reach the rollers in unison, the coils of both holding devices H and H' will be instantly energized, by the simultaneous dropping of arms 35 and 35' of the respective switches, while the several wipers of the selectors are concomitantly contacting with corresponding selector contacts.

The circuit at this instant is from the battery 22, positive side, coil E, wires 46 and 47, selector contact $b^1$, wiper $Bw$, line $L^2$, wiper $B'w$, contact $bb^1$, wire 48, holding device H', switch point 40′, wire 50, selector contact $ca^1$ of selector A′, selector wiper A′w, line $L^1$, wiper Aw of selector A, wire 51, holding device H, switch arm 35 to contact 40, wire 39, resistance R′ and line 44 to the negative side of the battery. As coil E is in this circuit, it is not deenergized by the breaking of its local circuit at point 41 of switch S, and there is no interruption in the operation.

If, however, in a succeeding cycle, motor M and its wipers is out of proper relation with motor M′, the motor M is stopped until M and M′ (and their associated cams and wipers are in the same relative position) when it is again started. Assume, for instance, that motor M is advanced with respect to motor M′. When this happens, the operation will continue until roller 36 drops into notch $n$ of cam N. At this time wipers Aw and Bw are on contacts $a^1$ and $b^1$ respectively. Since cam N′, driven by motor M′, is behind cam N, its roller 36 may not drop, and its selector wipers have not advanced to a point where they contact with their motor control contacts $aa^1$ and $bb^1$. When, therefore, roller 36 drops, dropping switch arm 35, the circuit through relay E is broken by the opening of contact at 41. When relay E is deenergized, it deenergizes the local circuit closing coil F, instantly opening switch 9 and stopping motor M in this position. Motor M′ continues, of course, to operate, but because contacts 38 of switch S are open, the continued operation of this motor does not effect signals or functions in the main station. Just as soon as motor M′ has moved its cam N′ (and associated parts) to the position corresponding to cam N at the central station, roller 36′ drops into notch n′, closing the circuit through holding devices H and H′ and through the relay E, to energize coil F and close switch 9, to again start the motor M, over the circuits traced in describing the normal operation of the motor.

Because of the shunt reactance across switch 9, the motor M is under tension while switch 9 is open, and starts instantly to move in synchronism with motor M′ when switch 9 closes. When motor M′ gets ahead of motor M, rotation of both motors will continue until motor M comes to a position such that the slot $n$ in the cam N attached to M is directly in register with the roller 36 when the roller will drop into slot $n$, due to the selector devices not being in synchronism, preventing a circuit being established to cause magnet H to function. When motor M′ has driven its selector device to a position such that a circuit is established through magnet H, the magnet will then withdraw roller 36 and the two motors will go forward with their selector devices in synchronism.

In Fig. 2 the selectors at the main station and sub-station are shown out of synchronism and correspondingly relative positions, so that coils E and F are deenergized.

As thus arranged, a relatively simple system for successively establishing a plurality of circuits between remote and distant points is obtained, and a novel and effective means is provided for ensuring synchronous, concomitant and orderly operation of the circuits. With every complete cycle of operation the circuits are subject to resetting, so that sustained inoperative movement of parts is impossible.

In Fig. 2 the diagram is similar to that shown in Fig. 1, but includes alarm circuits and teledynamic control circuits coupled into the system. Therefore, in order that Fig. 2 may be clearly understood, I have designated corresponding lines, circuits and apparatus by the same reference numerals in both Figures 1 and 2.

In order to give an indication when the coil E of relay 43 is deenergized, a suitable alarm, such as an audible signal 55 may be provided, the battery circuit for which is closed by the opening of the armature of the relay 43. A manual switch 56 may be included in this circuit.

Provision is also made for the indication of circuit and electric channel trouble which might result in false supervision and inaccurate control of the distant station equipment. To this end one of the fixed contacts of each of selectors A and B, say $a^{10}$ and $b^{10}$ may connect with the opposite sides of a battery 57. The mid-point of this battery is grounded through resistance $R^3$, at 58. In each of the lines $L^2$ and $L^1$ at the main station end are double wound relays 59 and 60, respectively. These relays control suitable signaling devices, preferably arranged as now about to be described. Relay 59 has one of its windings in line $L^2$ and one of its windings in circuit, when its armature is closed, with lamp $59^a$, wire 61, manual switch 62, winding G of relay 63, and the positive terminal of battery 22, and the circuit from the battery is completed by wire 64 leading from the negative side of the battery back to the relay 59. Relay 60 has one of its windings in line $L^1$, and its other winding, when its armature is closed, in circuit with lamp $60^a$ and battery 22 through the same circuit as relay 59.

Assume that a short circuit occurs across lines $L^1$ and $L^2$. When the respective wipers of the selectors A and B engage contacts $a^{10}$ and $b^{10}$, respectively, the relays 59 and 60 are energized, the circuit being from the positive of battery 57, contact $a^{10}$, wiper Aw of selector A, line $L^1$, including relay 60, the short circuit to line $L^2$, relay 59, wiper Bw of selector B, contact $b^{10}$ and the negative of the battery. This energization of relays 59 and 60 closes circuits through lamps $59^a$ and $60^a$ and since the windings of relays 59 and 60 are put in circuit with battery 22 when their armatures close, the lamps will keep burning until manual switch 62 is opened.

The lighting of the lamp also energizes coil G of relay 63 and its armature 63$^a$ is attracted to break the circuit of motor M, preventing further operation of the motor and false supervision or control. Armature 63$^b$ of this relay closes an audible signal circuit including battery 22 and signal 65.

In like manner, if either of the lines L$^2$ or L$^1$ become grounded, the respective relays 59 or 60 will be energized to light their respective lights 59$^a$ or 60$^a$, stop the motor M and sound alarm 65. The circuit in the event of a ground is closed through the central ground connection 58 of battery 57.

Since the windings of relays 59 and 60 are in series with the lines L$^2$ and L$^1$ respectively and the battery 22 through the several selector circuits, battery 22 will function to energize one or both relays 59 and 60 in the event of abnormal conditions, so that battery 57 has a more or less auxiliary function and provides for an automatic circuit test with each revolution of the wipers of the main station selectors. Since relays 59 and 60 are in series with the battery 22 and the lines L$^2$ and L$^1$, it is desirable that all other station relays be of sufficient resistance to prevent operation of the relays 59 or 60 under the normal functioning of the system.

The supervisory and distant control or teledynamic control feature hereinbefore mentioned may now be described. This contemplates a system wherein, by the operation of a switch key at a main station, an operator may control a piece of apparatus at the distant station, as desired, such for instance, as the stopping and starting of motors or generators or the opening and closing of switches and other similar functions.

Our invention as respects this feature, preferably proposes that both direct and alternating current be employed in effecting any remote control whereby it is highly improbable that any condition of trouble which might possibly occur in the lines or channels connecting the two stations could cause operation of the distant equipment. The invention also contemplates the provision of appropriate relay circuits whereby the operator may close a key to control a given piece of apparatus at any time in the cycle of revolution of the wipers of the selectors, and the control circuit be completed when the wipers engage the proper selector contact.

For the purpose of illustration it may be assumed that one or more remote electromagnetic switches P are to be controlled from a main station. This switch, as described in connection with Fig. 1, may include the switch element P, a switch closing solenoid $p^1$ and a switch opening solenoid $p^2$. A common wire 70 leads from both solenoids to one side of a local battery 71. Wire 72 leads from the switch closing solenoid $p^1$ to a direct current relay 73, and from the contacts of this relay wire 74 leads to the other side of battery 71. The winding of relay 73 has one side connected through wire 75 with one of the selectors, say contact $bb^3$ of selector B$^1$. A choke 75$^1$ for damping alternating currents may be included in line 75. From the other side of winding of relay 73 is a line 76 going to the contacts of an alternating current relay 77, and from the contacts of this relay is a wire 78 connecting to wire 32 that connects through switch S$^1$ with the wire 31 from the simplexed circuit L$^3$ and L$^4$.

The winding of relay 77 has one side connected through wire 79, in which may be a condenser 79$^1$, to the contact $aa^3$ of selector A$^1$, this contact corresponding to the contact of selector B$^1$ to which direct current relay 73 connects. The other side of this relay winding is grounded.

To energize solenoid $p^1$ it is necessary to first energize the alternating current relay 77, to close the circuit for the direct current relay 73, then energize 73 and thereby close the $p^1$ solenoid circuit. This is closed as hereinafter described.

For the switch opening solenoid, $p^2$, a similar circuit is employed. A wire 80 leads from the solenoid $p^2$ to the contacts of direct current relay 81 and the contacts of relay 81 connect to wires 74 to the local battery 71. One side of the winding of relay 81 connects through choke coil 82$'$ and wire 82 with wire 79 leading to contact $aa^3$. It will thus be seen that the windings of the alternating current relay 77 and the winding of direct current relay 81 connect with the same contact. The choke coil 82$'$ protects relay 81 against operation when an alternating current is impressed on contact $aa^3$ while condenser 79$'$ protects relay 77 against operation when a direct current is impressed on contact $aa^3$.

The other side of the winding of relay 81 connects through wire 83 with the contacts of alternating current relay 84. Leading from one of these contacts of alternating current relay 84 is wire 85 connecting to wire 78 leading to the simplexed circuit as described.

The alternating current relay 84 has one side of its winding connected through wire 86, including condenser 86$'$ to wire 75 leading to contact $bb^3$ of selector B$'$, so that relays 73 and 84 connect with the same selector contact, but the choke coil and condenser in their respective circuits provide selective action for the relays. The other side of the winding of relay 84 is grounded.

While we have shown an arrangement of two direct current relays and two alternating current relays, it will be obvious that any corresponding arrangements selectively operable with different current characteristics could be substituted, as those skilled in the art will readily understand. Both the direct current relays are of the slow releasing type in order to ensure the proper operation of solenoids $p^1$ or $p^2$.

At the main or control station is a switch K of a well known type in which movement of the switch lever in one direction closes one circuit by engagement of the lever projection against spring $k^1$ and movement of the lever in the other direction closes another circuit by engagement of the lever projection against spring $k^2$. In this type of switch, release of the lever causes it to return to normal position. One set of contacts for the switch is designated $k^1$ and the other set is $k^2$.

The negative side of battery 22 connects with each set of contacts, $k^1$ and $k^2$ through a wire 90, a signal light 91, manually operable switch 92 and wire 93. Wire 93 extends further to connect with one of the contacts 94' and 95' respectively of each of two self holding relays 94 and 95.

The winding of relay 94 connects through wire 96 with one side of switch contacts $k^1$, while the other side of the winding connects through wire 97, contacts 98' of relay 98 these contacts being closed when the winding is deenergized to wire 24 leading to the positive side of the battery. The closing of key K to operate contacts $k^1$ therefore energizes relay 94. When relay 94 is energized, contacts 94' are closed, establishing a shunt circuit around the key contacts $k^1$ so that when the key K returns to normal position, the relay 94 will remain energized. This condition continues until relay 98 is energized to open contacts 98'. The winding of relay 98 is in series with supervisory signal lamp 20.

Similarly the relay 95 connects through wire 99 with contacts 100' of relay 100. In Fig. 2, relay 100, which has its winding in series with signal lamp 21, is shown as being energized, breaking the circuit of relay 95 at 100' as the circuit of relay 95 would otherwise be completed through contacts 100' and wire 24 to the positive side of battery 22.

Operation of switch key K to close contacts $k^2$, would, if relay 100 were deenergized, complete a circuit through relay 95, energizing this relay, and through contacts 95', shunt the switch elements $k^2$ until the circuit was broken, as described in connection with relay 94.

Relay 94 also operates a double switch having contacts 94$^a$ and 94$^b$. Relay 95 operates a double switch having contacts 95$^a$ and 95$^b$. Contacts 94$^b$ and 95$^a$ of these two relay operated switches connect at one side through wire 101 to one side of an alternating current source, such as generator 102. The other side of this generator is grounded. The other side of switch 94$^b$ connects through wire 103 with contact $a^3$ of selector A, this contact corresponding to contact $aa^3$ of selector A'. The other side of switch 95$^a$ connects through wire 104 with contact $b^3$ of selector B, this contact corresponding to contact $bb^3$ of selector B'.

Relay switches 94$^a$ and 95$^b$ connect through wire 105 with the positive side of battery 22. The other sides of switches 94$^a$ and 95$^b$ connect with wires 104 and 103 respectively.

Consequently, operation of relay 94 serves to put an alternating current potential on selector contact $a^3$ and a direct current potential on contact $b^3$, while operation of relay 95 has just the reverse effect.

Now, for instance, suppose switch contacts $k^1$ are closed by operation of switch K. A circuit is then completed from the negative of battery 22, wire 90, lamp 91, closed switch 92, wire 93, contacts $k'$, the winding of relay 94, wire 97, contacts 98' of relay 98, and wire 24 to the positive of battery 22. Operation of armature 94' shunts switch contacts $k'$ so that the circuit remains in this condition upon release of switch key K. Energization of relay 94 operates switches 94$^b$ and 94$^a$ to impress an A. C. potential on contact $a^3$ of selector A, and a D. C. potential on contact $b^3$ of selector B. When the wipers Aw and Bw, (moving concomitantly with wipers A'w and B'w of selectors A' and B') move simultaneously onto contacts $a^3$ and $b^3$, respectively, an A. C. circuit is closed from generator 102, wire 101, switch 94$^b$, wire 103, contact $a^3$, wiper Aw, line L', wiper A'w, contact $aa^3$ of selector A', alternating current relay 77 to ground and back to the generator. At the instant relay 77 is energized, a direct current circuit is closed from the positive of battery 22, wire 105, switch 94$^a$, wire 104, selector contact $b^3$ of selector B, wiper Bw, line L$^2$, wiper B'w of selector B', contact $bb^3$, the winding of relay 73, wire 76, wire 78, wire 32, switch S', wire 31, simplexed circuit L$^3$—L$^4$, wire 30 and switch S back to the negative of the battery.

The energization of relay 73 closes the local battery circuit at the sub-station to solenoid $p^1$ to close the remote station switch P. Closing of switch P operates supervisory signal control switch 28, and when the wipers move to position to close the supervisory signal circuit, relay 98 will be energized at the same time the signal lamp 20 is lighted, thereby breaking the circuit for relay 94 at relay contacts 98', extinguishing the lamp 91. At the same time, relay 100, which is energized when lamp 21 is burning, is deenergized as lamp 21 is extinguished.

In this manner, supervision and control of several remotely located devices may be effected, the circuits to the various devices being established in orderly sequence at regular periods of time. To include other switches and signals than those shown requires a mere duplication of central and distant station circuits without the addition of other interstation wires than the four described. Since remote control can only be established, in the preferred form of the invention, by the operation of both alternating and direct current operated devices it is hardly probable than any condition could arise that might cause improper operation of the controlled devices.

In Figures 1 and 2, we have illustrated a preferred embodiment of the invention wherein a maximum of four wires, $L^1$, $L^2$, $L^3$, and $L^4$, are used. Such a system is preferable because any chance of error or faulty operation through a short circuit or by reason of ground potentials is reduced to a minimum.

However, the number of wires may be reduced as will be obvious to those skilled in the art. In Fig. 4 we have illustrated an embodiment of the invention wherein the desired number of wires is reduced to two. These two wires are the power lines for the distant station motor and can be simplexed so that, in so far as the signal function of the system is concerned, there is but a single wire or channel.

Referring to Fig. 4, $M^3$ designates the main station actuator or motor, and $M^4$ is the distant station actuator or motor. The motor $M^3$ is energized, from a suitable source of alternating or pulsating direct current 105. The circuit for this motor is generally similar as hereinbefore described in connection with Figures 1 and 2, such circuits including a manually operable switch 106, alarm circuit relay contacts 107, and an electromagnetic switch 108.

The distant station motor $M^4$ is energized through a pair of connecting lines including transformers as described in connection with Figure 1 and this circuit is preferably simplexed. The simplexed circuit is designated $L^5$.

The main station motor is adapted to actuate the cam $N^3$, and a single selector $A^3$. The distant station motor $M^4$ operates only the selector $A^4$.

The electro-magnetic switch 108 is controlled by a relay 109 and the winding of this relay is included in a circuit, one side of which is grounded, and the other side of which is normally closed through variable resistance R, a switch $S^3$, resistance $R'$, wire 110, and local battery 111. The switch $S^3$ is generally similar to switch S described in Figure 1 and is adapted to be controlled by the cam $N^3$. This switch may be closed by an electro-magnet $H^3$ energized from the local battery 111.

One of the contacts of the selector $A^3$ is connected through the winding of an alternating current relay 112 to a source of grounded alternating current 113. The corresponding contact of the selector $A^4$ is grounded through a condenser 114.

If motors $M^3$ and $M^4$ are operating in synchronism and are coincident so far as the position of the wipers of their respective selectors is concerned, the motors will continue to operate. If, however, the two motors are not coincident, motor $M^3$ will continue to operate until the peripheral notch of cam $N^3$ moves beneath the roller of switch $S^3$. When the cam is in this position, the switch $S^3$ will open the relay circuit 109 to release the electro-magnetic switch 108 and will connect the winding $H^3$ of switch $S^3$ in circuit with the local battery 111. The circuit through the winding $H^3$ to the local battery can not be completed, however, until the alternating current relay 112 is energized. When relay 112 is energized, the circuit will then be from negative side of battery 111, conductor 110, coil $R'$, through made contacts of switch $S^3$ in released position, coil $H^3$, made contacts of relay 112, thence through coil of relay 109 to positive side of battery 111. The motor $M^3$ must then stop until such time as the alternating current relay 112 is energized. When the wiper of selector $A^4$ engages the contact which is grounded through condenser 114, a current will flow from source 113, through the winding of alternating current relay 112, through the selector $A^3$, through the alarm circuit relay 117 and to the simplexed circuit $L^5$ and from the simplexed circuit $L^5$ through the selector $A^4$ to the ground and through the ground back to the source 113. In this manner, a resetting of the motor $M^3$ may be automatically effected to restore the coincident operation between the two motors.

The local signal circuits are substantially the same as those previously described. The control circuits for the local circuits are also generally similar to those previously described. Instead, however, of controlling one signal such as 115 through one selector circuit, and another signal such as 116 through an entirely different selector, both signals are now controlled in the same selector circuit, but in different contacts of that common selector. The signal control circuit from the main station selector to the distant station selector may be traced from the wiper of selector $A^3$ through the alarm control relay at 117, the simplexed circuit $L^5$ and the distant station selector $A^4$. The return circuit from the distant station selector and the apparatus at the distant station to the main station is through the ground. A ground for one circuit at the distant station is indicated at 118, and a choke coil 119 may be included in this ground circuit. The condenser 114 in the motor control circuit protects the motor control circuit against operation when the grounded direct current circuit is closed, and the choke coil 119 protects the direct current circuit against false operation when the alternating control circuit is closed through the ground.

From the foregoing, it may be seen how the number of channels or wires between the main stations may be varied in accordance with the conditions and requirements of the installation. It will also suggest to those skilled in the art, how various other changes and modifications in the circuits may be made. It will also be seen that outside of its power function in carrying operating current to the distant station motor, the simplexed circuit $L^5$ is the same as a single conductor between the two stations.

A further advantage incident to the invention described, is that, in so far as the supervisory indication, remote control and resetting or synchronizing circuits are concerned, no battery is necessary at the controlled or sub-station, the entire circuit being energized from the main station battery 22. This of course does not mean that the battery generally provided in a sub-station for the operation of the switches is eliminated, but that the indication, control and re-setting circuits per se are dependent only on the main station source.

It will be understood that we have described preferred forms of the invention in considerable detail, but that a wide range of modifications and changes are contemplated, and that various circuit arrangements, electric and mechanical functional equivalents, and various reversals or substitutions are to be considered as falling within the spirit and the scope of our invention.

We claim as our invention:

1. In a system of the class described, a plurality of motors of the synchronous type, with a source of supply therefor of identical frequency, and a control circuit for one of the motors, said circuit including a circuit closing device driven by each motor and an electro-magnetic switch in circuit with said circuit closing devices for controlling the current flow to the controlled motor, a cam element driven by the controlled motor associated with said electro-magentic switch to prevent operation of said switch except as permitted by the cam whereby said switch may only operate when in predetermined relation with the said circuit closing devices driven by the motors.

2. In a system of the class described, with main and distant station selectors, having a pluality of contacts, with a motor at each station connected with each selector, said motors being of the synchronous type, means for supplying each motor with a characteristically similar current for operating them at the same speeds in synchronism, a control circuit for one of the motors, said circuit including corresponding contacts of the main and distant station selectors and an electro-magnetic switch controlled by the operation of the selectors, whereby when the selectors are in synchronism an independent circuit is closed through them for the switch; and a cam driven by the controlled motor and operatively engaging the switch to prevent the actuation thereof, except at a predetermined position.

3. In a system of the class described having a main station and a controlled station, a selector unit at each station, the selector units for each station including an actuating element, a cam element, and a selector switch, a line or lines connecting the selector switches and actuating elements of each unit, said actuating elements being synchronously movable when energized from current of the same characteristics, means for supplying both actuating devices with a current of corresponding characteristics, an electro-magnetic switch associated with each unit and responsive to the cam element therefor, said switches controlling one of the actuating devices, and a control circuit including the electro-magnetic switches and the selectors, whereby when the selectors are in synchronism an independent circuit is closed through them for the switch; said switches and selectors serving to stop the controlled actuating device when said cams are out of coincidence and to restore operation of the controlled actuating device when the cams are again coincident.

In testimony whereof we hereunto affix our signatures.

CHARLES B. BARTLEY.
VIRGIL H. DAKE.